3,794,541
METHOD OF MAKING FLAT CLUTCH PLATES
Walter J. Schissler, Oak Forest, Ill., assignor to Borg-Warner Corporation, Chicago, Ill.
Filed Nov. 26, 1971, Ser. No. 202,284
Int. Cl. B32b 31/02
U.S. Cl. 156—228      7 Claims

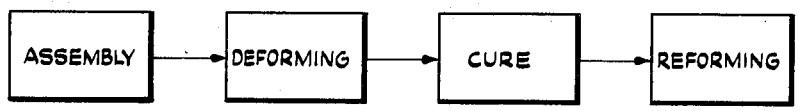
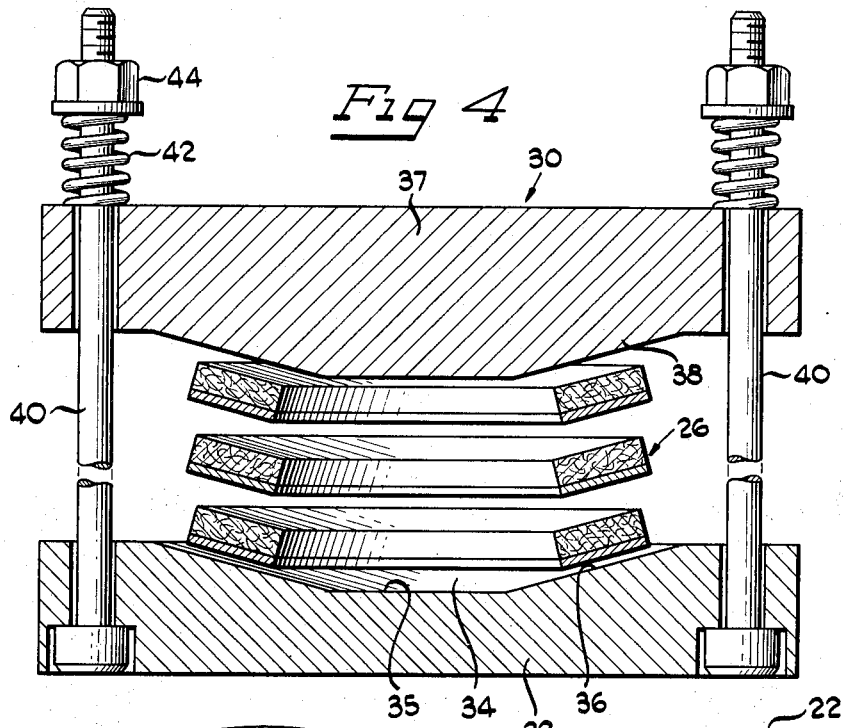
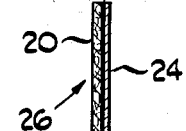
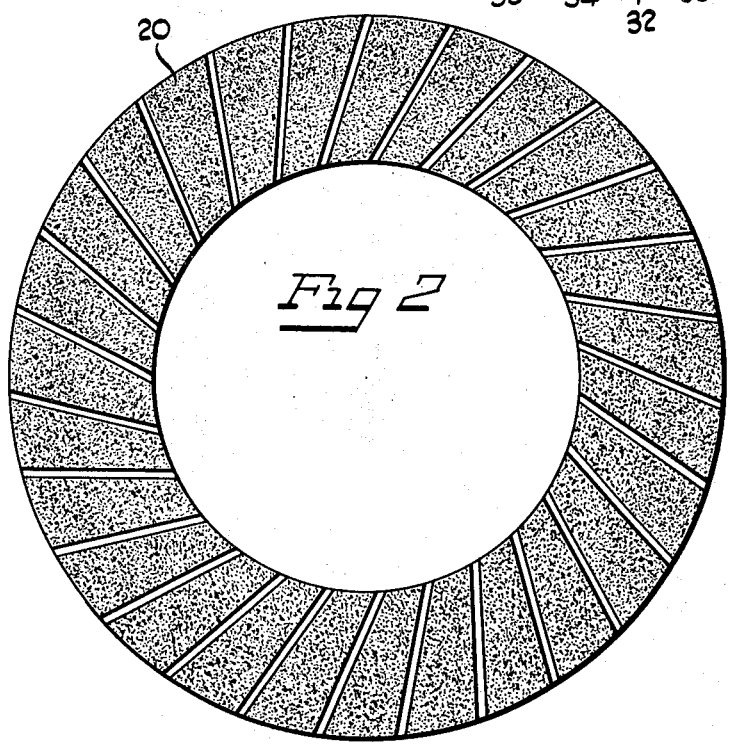

ABSTRACT OF THE DISCLOSURE

Disclosed is a method of producing composite type, flat clutch discs which consists of deforming the clutch disc assembly during heat treating in such a way that the internal stresses developed during said heat treatment will be countered by the stresses induced by the deformation such that the finished product attains the desired flat condition.

BACKGROUND OF THE INVENTION

This invention relates to the method of making a clutch plate, more particularly, it relates to the method of making a high performance clutch plate. With the advent of high performance engines, clutch plates must withstand extremely high rotational speed and be capable of transmitting high torque. One method of making a clutch plate capable of withstanding high speed, is to bond the friction material to a backing plate and to provide a solid material face which is bonded to the backing plate. Clutch plates so made are capable of withstanding the required speed, but the heat required to cure the bonding agent creates internal stresses which tend to distort the clutch plate from its flat condition.

A high performance clutch should be as flat as possible in order to permit the use of multiple discs for transmitting the additional torque produced by a high performance engine. Because a multiple disc clutch is a stack of clutch plates, the distance moved to release each clutch plate is limited. If even one of the plates of a multiple plate clutch is not flat, a drag will be created in the clutch. The amount of adjustment in the releasing mechanisms of the clutch is not adequate to provide for several clutch plates to be less than flat. It is, therefore, obvious that a high performance clutch should withstand high speed and should be as flat as possible.

SUMMARY OF THE INVENTION

According to the present invention, a high performance clutch plate is made by attaching a friction material to a metal backing using a bonding agent. During the heat of curing the bonded agent, the clutch plate assembly is clamped in a deformed condition to impart counteracting stresses which upon completion of the curing process and a cooling period causes the clutch plate assembly to assume a flat state upon removal from the fixture.

DESCRIPTION OF THE DRAWINGS

FIG. 1 is a flow chart illustrating the various steps used in the method of the present invention;
FIG. 2 is a plan view of the clutch plate made by the method of the present invention;
FIG. 3 is a side of the clutch plate of FIG. 2; and
FIG. 4 is an exploded cross-sectional view of the fixture used in one step of the method according to the present invention.

FIG. 1 indicates the steps involved in this novel method of producing a clutch plate. The first step in the method of making a high performance clutch assembly according to the present invention is the assembly of the parts of the clutch plate. This step involves coating the metallic backing material 24, as best seen in FIG. 3, with a bonding agent 22 and placing the material in contact with a friction material 20 forming a clutch plate assembly 26.

The second step of the process is to deform the clutch assembly. The deforming of the clutch assembly is accomplished in a fixture 30, as best seen in FIG. 4. The fixture 30 is composed of a base plate 32 having a frusto-conical concave recess 34 formed therein. The recess 34 is in the form of a dish having a relatively flat bottom 35 and tapering edges 36. An upper plate 37 is provided having a protruding portion 38 of a convex frusto-conical shape that complements the recess 34 of the bottom plate.

Bolts 40 are provided to secure the base plate to the upper plate. Springs 42 are provided under the nuts 44 to provide a resilient clamping force which remains substantially uniform even though the fixture is subjected to thermal contractions or elongations as a result of temperature changes during cure of the bonding agent and subsequent cooling period.

The deforming step is accomplished by stacking one or more clutch plate assemblies 26 in the fixture 30 positioned such that the metallic backing plate 24 is next to the recess 34. The upper plate 37 is then clamped to the base plate 32 and the protruding portion 38 thereof deforms the clutch plate assemblies 26 into the dish shaped recess. The plates 32 and 37 are resiliently held together by the bolts 40, springs 42 and nuts 44.

The third step is indicated as curing. While the clutch plate assemblies are held deformed in the fixture, they are heated to effect curing of the bonding agent.

The fourth step is indicated as re-forming. After the fixture holding the deformed clutch plate assemblies has been heated sufficiently to accomplish cure of the bonding agent and allowed to cool to approximately room temperature, the fixture is released and as the clutch plate assembly is removed it assumes and retains a substantially flat condition as indicated in FIG. 3. The re-forming to the flat state of the clutch plate assemblies is caused by the counteraction of the internal stresses created by the conical shaped fixture off-setting the stresses caused by the curing process.

By way of example, without any intention to limit the scope of the invention, the materials used in this process are: an organic woven friction material made to the specification US 969X; the bonding agent used is known commercially as *cycloweld H-2;* the backing material used is aluminum.

Several combinations of times and temperatures have been found to cure the bonding agent successfully. Among the successful curing schedules are 325° F. for 3 hours and 280° to 290° F. for 12 hours. After curing, the assembly is air cooled to room temperature.

The cone angle of the deforming fixture is in the order of 2° and as many as 40 assemblies have been cured in one fixture.

Having thus described the method of producing flat clutch plates for high performance use, it will be obvious to those of ordinary skill in the art that various changes may be made in this process without departing from the scope of the invention as defined in the appended claims.

I claim:
1. The method of making a flat friction plate assembly including a flat backing plate to which a friction material is attached by a bonding agent, said method comprising:
    assembling said friction material, said bonding agent and said backing plate,
    deforming said assembly to a dish shape having the backing plate forming the convex side,
    heating said assembly to cure said bond, and cooling said assembly causing said assembly to re-form as a flat friction plate assembly.
2. The method of claim 1 in which said assembly is deformed by clamping in a fixture, said curing of said bonding agent being accomplished while said assembly is clamped in a deformed condition.

3. The method of claim 2 in which said re-forming takes place after said assembly is removed from said fixture.

4. The method of making a clutch plate, which method comprises:
assembling a flat friction disc to a flat metal backing plate using a bonding agent,
clamping said assembly in a fixture which imparts a dish shape to said assembly,
heating said clamped assembly to cure said bonding agent,
cooling said clamped assembly,
opening said fixture whereby said assembly returns to its flat shape.

5. The method as claimed in claim 4 wherein said fixture comprises:
a base plate having a recess formed therein,
said recess being round and having a substantially flat center portion with edges tapering outwardly to form a dish shape,
said recess adapted to receive said assembly with said metal backing plate facing into said recess,
an upper plate having a projecting portion shaped complementary to said recess, and
means for resiliently urging said plates together whereby said assembly would be deformed by the interaction of said plates.

6. The fixture of claim 5 wherein a plurality of clutch assemblies may be clamped.

7. The method of making a clutch plate, which method comprises the steps of:
assembling a flat friction disc to a flat backing plate with a bonding agent,
applying a clamping force to said assembly in a fixture which deforms said assembly into a frusto-conical shape having the backing plate on the convex side,
heating the deformed assembly in said fixture to cure said bonding agent,
cooling said deformed assembly in said fixture, and
releasing said clamping force whereby said assembly returns to a flat shape due to the internal forces developed during curing.

References Cited
UNITED STATES PATENTS

| 1,620,043 | 3/1927 | Stanley | 192—107 R |
| 2,873,517 | 2/1959 | Wellman | 29—420.5 |
| 2,258,431 | 10/1941 | Wellman | 214—10.5 R |

ALFRED L. LEAVITT, Primary Examiner

F. FRISENDA, Assistant Examiner

U.S. Cl. X.R.

29—446; 156—288, 311